Dec. 22, 1970          G. SCHWARTZMAN          3,549,269
FOAMED PLASTIC HEADED APPLICATOR AND METHOD OF MANUFACTURE
Filed Sept. 6, 1968
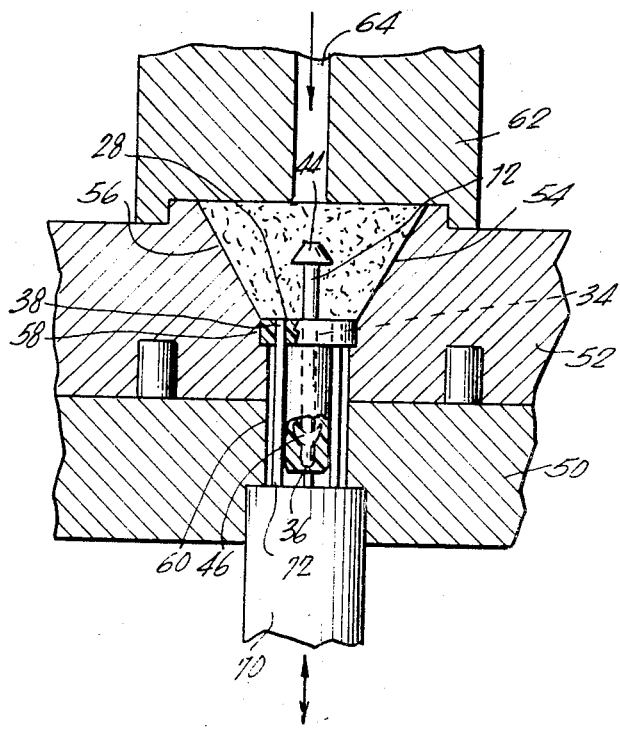
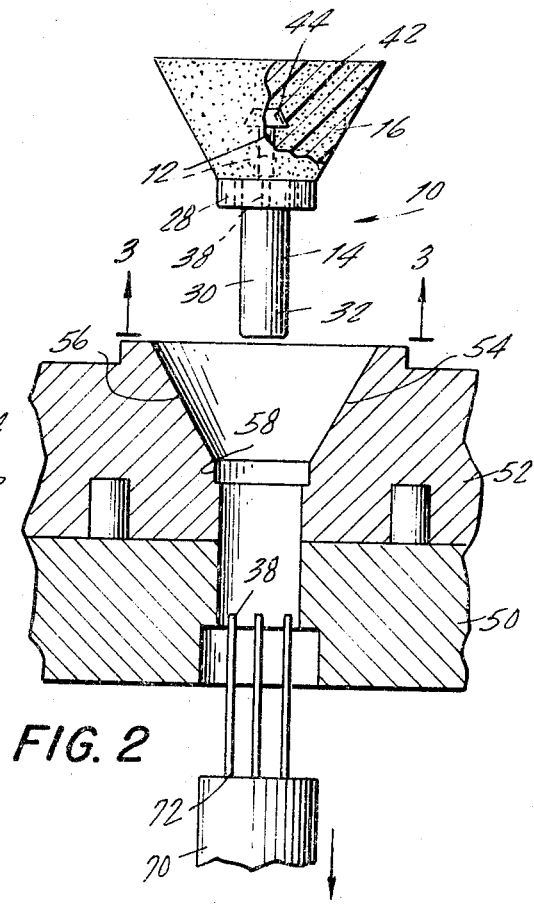
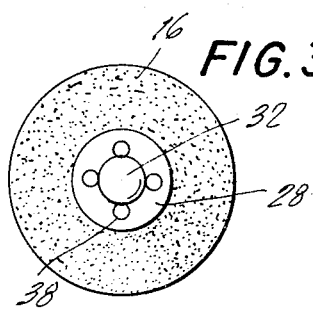
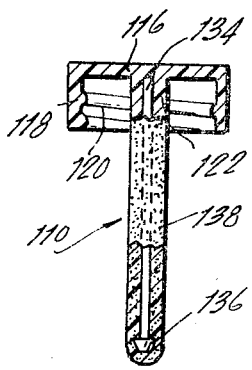
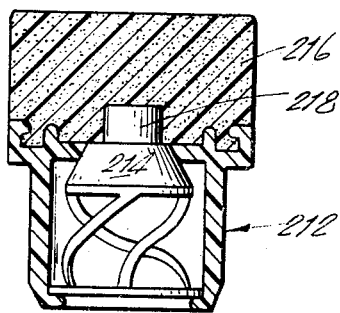
INVENTOR.
GILBERT SCHWARTZMAN
BY
Kenneth S. Goldfarb
ATTORNEY United States Patent Office 3,549,269
Patented Dec. 22, 1970

3,549,269
FOAMED PLASTIC HEADED APPLICATOR AND METHOD OF MANUFACTURE
Gilbert Schwartzman, 20 Wilmot Circle, Scarsdale, N.Y. 10583
Filed Sept. 6, 1968, Ser. No. 757,818
Int. Cl. B43m *11/06*
U.S. Cl. 401—206      4 Claims

ABSTRACT OF THE DISCLOSURE

An applicator and method of manufacture which comprises the concept of inserting a rigid stem in a resilient stretchable body. Core rods are inserted through the body and polyurethane foam is molded onto the stem and bonded to the body after which the core rods are removed to form the applicator.

---

This invention relates to a foamed plastic headed applicator especially adapted for applying shoe polish or like materials or for applying cosmetics, medications and other fluid material on the shoes, clothing or on the person of the user, and to a method of manufacture of the applicator.

The primary object of the present invention resides in the provision of applicator means for facilitating the application of shoe polish, cleaning fluids, medications, cosmetics or the like over a relatively large area with the fluid to be applied being automatically delivered upon forced engagement of the dauber head with the surface on which the substance is to be applied.

In the past various types of daubers and applicators have been developed which serve to actuate relatively complicated mechanical valves. The concept of the present invention employs the use of a resilient stretchable body which is inserted in a bottle or other container and so arranged that in its normal position no fluid may pass through the body which serves as a stopper. However, when the applicator head, which has a relatively large surface area, is engaged with the surface on which fluid is to be applied, pressure on the applicator head will cause the stem to stretch the body to an extent whereby a fluid passage is formed from the interior of the container outwardly to deliver fluid conveniently to the lower portion of an applicator head. This applicator is an improvement over U.S. Pat. No. 3,370,909 for "Dauber and Closure Assembly," issued Feb. 27, 1968. The applicator head is formed of a fluid absorbent material such as polyurethane foam and is used to coat the shoe polish or other material on the shoes or other surface. In manufacturing the applicator, the polyurethane foam is molded directly onto the movable stem and the concept of this invention includes the provision of a method of assuring that the bores in the resilient body will not be clogged by the polyurethane foam.

Still further objects and features of this invention reside in the provision of an applicator which is especially inexpensive to manufacture, simple to use, which provides for a good seal and stopping of a fluid container, yet which is capable of automatically metering fluid over a large area proportional to the manner and vigor of use of the applicator so that shoe polish, cleaning fluids, medications, oils, cosmetics, polishes and the like can be conveniently applied utilizing the invention.

These, together with the various ancillary objects and features of the invention which will become apparent as the following description proceeds, are attained by this applicator and method of manufacture thereof, preferred embodiments of which applicator and the step of manufacturing being illustrated in the accompanying drawing, by way of example only, wherein:

FIG. 1 is a vertical sectional view of a mold illustrating a step in the manufacture of the applicator in accordance with the concept of the present invention;

FIG. 2 is a vertical sectional detail view of a mold illustrating a further manufacturing step and illustrating the completed applicator with parts being shown in section.

FIG. 3 is a plan view of the applicator looking in the direction of line 3—3 in FIG. 2;

FIG. 4 is an exploded sectional view of a modified form of applicator; and

FIG. 5 is a vertical sectional view of a further modified form of applicator.

With continuing reference to the accompanying drawing, wherein like reference numerals designate similar parts throughout the various views, reference numeral 10 is used to generally designate an applicator constructed in accordance with the concepts of the present invention. The applicator includes three main parts, a stem 12, a body 14, and a dauber head 16. The body 14 fits in the neck of a container, not shown, such as a bottle constructed of glass or suitable plastic material having a neck provided with an opening therethrough defining a lip. The container is filled with any suitable fluid material, as for example, shoe polish.

The body 14 is formed of a suitable resilient and stretchable material such as polyurethane, rubber or rubber-like materials, or any convenient synthetic plastic material, and includes a disc 28 and a lower portion 30 integral with the disc 28 and having cylindrical side walls 32, the lower portion 30 being of a lesser diameter than the disc 28. The lower portion 30 is of a greater diameter than that of the opening in the neck of the container or is of exactly the same diameter thereof so that the lower portion 30 when inserted in the opening in the neck is force fitted therein. The applicator head 16 is of a generally truncated conical shape bonded to and overlying the disc 28 and having an enlarged applicator planar surface 42. The head 16 encompasses the locking head 44 of truncated conical shape which is formed on the free end of stem 12.

The body 14 includes a cylindrical recess 34 which extends through the disc 28 and downwardly to a portion where its bottom 36 is spaced from the lowermost edge of the body 14. The stem 12 engages the body at the lowermost part of the recess 34. The stem 12 is provided with anchoring means as is desired such as barbs 46 for preventing accidental disengagement of the stem 12. A plurality of bores 38 are annularly spaced about the recess 34 and extend through the disc 24. The polyurethane foam applicator head 16 overlies the bores 38 and is adapted to absorb fluid from the container passing through bores 38.

When the invention is assembled in the container, and with the body 14 inserted through the opening in the neck, and with the stem 12 disposed in the recess 34, the side wall 30 will bulge so as to effectively retain the body 14 in the neck of the container with the body serving as a stopper. In normal inactive position, the bores 38 terminate at a point outwardly of the lip 20 and no fluid may flow past the body 14. However, in use, upon forceable pressure on the applicator head 16 on the surface to be coated with fluid, the stem will stretch the lower portion 30 of the body 14 to the extent that fluid can pass between the lower portion 30 and the neck of the container and the bores 38 extend inwardly and communicate with the fluid passing through space between the neck and the lower part 30 of the body 14 allowing fluid to be delivered into the applicator head 16. As soon as pressure on the applicator 16 is terminated, the stretchable material of the body 14 will return the body to the position as shown in FIG. 2.

The applicator 10 heretofore defined is manufactured in a molding apparatus. A two-part molding base 50 and 52 is provided having a capacity 54 provided with a conical portion 56, a relatively large diameter cylindrical portion 58, and a relatively narrow cylindrical portion 60. An upper mold part 62 is provided with a sprue 64 and is designed to close the cavity 54 and provide for the filling of the cavity 54. The body 14 with the stem 12 inserted therein is placed in the mold cavity 54. Then, the upper mold part is placed in a closed position and a solution of foaming polyurethane is poured in the sprue 60 whereupon it bonds with the disc 28 and encompasses the locking head 44 and the balance of the stem 12. In order to prevent the bores 38 from filling up, a core assembly 70 is provided which includes a plurality of core rods 72 which are inserted in the bores 38.

It is within the concept of the present invention to provide cutting dies on the free ends of the core rods 72 so that the bores 38 are actually cut in the disc 28 as the core assembly 40 is moved into the position as shown in FIG. 1. The core assembly 70 may be electrically heated as is necessary or desirable for forming the bores 38.

After the foaming polyurethane has set, the core assembly 70 is removed as indicated in FIG. 2, the upper mold part 62 is lifted, and the applicator 10 is removed. The top surface of the applicator head 16 may be trimmed to provide for the flat or planar enlarged surface 42.

In the embodiment shown in FIG. 4, an applicator is generally indicated at 110 for use in connection with a container 112 having an externally threaded neck 114. The applicator assembly includes a body 116 having a flange 118 provided with internal threading 120 and having a central portion 122 provided with a stem 134 embedded therein and extending therebeyond. The stem is provided with a locking head 136 of truncated conical shape and an applicator head 138 of polyurethane foam encompasses the stem 122 and is bonded to the central portion 122 and lockingly held in place by the locking head 136 which also serves an additional purpose of providing for cushioned rigidity at the end of the applicator head 138. The flange 118 functions in conjunction with the body 116 to form a closure cap for the container 112.

In FIG. 5, there is shown a further modification in which an applicator retaining ring 212 of the type disclosed in Pat. No. 3,203,026 for "Fluid Applicator," issued Aug. 31, 1965. A valve assembly 214 is provided with the retaining ring 212 and a porous resilient applicator head 216 is initially bonded to the retaining ring 212 and to the valve head 218 of the valve assembly 214 so as to provide for an initial seal while holding the valve assembly in a closed position. After initial actuation, the valve head 218 is freed from the applicator head 216.

A latitude of modification, substitution and change is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. An applicator comprising a body of resilient stretchable material having an upper disc and a lower cylindrical portion of smaller diameter than said disc and integral therewith, said body having a central recess therein opening at said disc and extending through said disc and terminating near the end of said lower portion remote from said disc, a plurality of bores through said disc, a rigid stem disposed in said recess and having an end extending outwardly of said body, a locking head on said end, and an applicator head of porous flexible material disposed about said locking head and bonded to said body overlying said bores, said locking head being movable with respect to said disc.

2. An applicator according to claim 1, wherein said bores are disposed annularly about and spaced from said central recess and extend parallel thereto.

3. An applicator according to claim 1, wherein said applicator head is of a substantially truncated conical shape having an enlarged planar daubing surface.

4. An applicator according to claim 1, including anchoring means on said stem for holding said stem in said body.

References Cited

UNITED STATES PATENTS

| | | | |
|---|---|---|---|
| 1,962,875 | 6/1934 | Reber | 401—130X |
| 2,547,881 | 4/1951 | Murray | 401—206 |
| 3,087,191 | 4/1963 | Plunkett | 401—130 |
| 3,296,649 | 1/1967 | Schwartzman | 401—206 |
| 3,355,240 | 11/1967 | Schwartzman | 401—205 |

HARLAND S. SKOGQUIST, Primary Examiner